US012415358B2

(12) United States Patent
Kanamura et al.

(10) Patent No.: US 12,415,358 B2
(45) Date of Patent: Sep. 16, 2025

(54) SERVER, PRINTING SYSTEM AND METHOD OF CONTROLLING PRINTING SYSTEM

(71) Applicant: SEIKO EPSON CORPORATION, Tokyo (JP)

(72) Inventors: Naoya Kanamura, Shiojiri (JP); Katsuaki Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 244 days.

(21) Appl. No.: 18/191,466

(22) Filed: Mar. 28, 2023

(65) Prior Publication Data

US 2023/0311513 A1 Oct. 5, 2023

(30) Foreign Application Priority Data

Mar. 29, 2022 (JP) ................................ 2022-053106

(51) Int. Cl.
*B41J 2/165* (2006.01)

(52) U.S. Cl.
CPC ....... *B41J 2/16517* (2013.01); *B41J 2/16579* (2013.01); *B41J 2/16508* (2013.01); *B41J 2/16523* (2013.01)

(58) Field of Classification Search
CPC ......................... B41J 2/16517; B41J 2/16579
See application file for complete search history.

(56) References Cited

U.S. PATENT DOCUMENTS

| | | | | |
|---|---|---|---|---|
| 2018/0267756 | A1* | 9/2018 | Lee | B41J 29/393 |
| 2020/0269583 | A1 | 8/2020 | Shiratori et al. | |

FOREIGN PATENT DOCUMENTS

| | | | |
|---|---|---|---|
| JP | 2014094449 A | * | 5/2014 |
| JP | 2018001672 A | * | 1/2018 |
| JP | 2020131631 A | | 8/2020 |
| JP | 2022126126 A | * | 8/2022 |

* cited by examiner

*Primary Examiner* — Sharon Polk
(74) *Attorney, Agent, or Firm* — CHIP LAW GROUP

(57) ABSTRACT

A server connected via a network to a printing apparatus including a plurality of nozzles includes an acquisition unit that acquires nozzle information indicating a state of the plurality of nozzles, a determination unit that determines, among the plurality of nozzles, a nozzle to be cleaned based on the nozzle information acquired by the acquisition unit, and an instruction unit that instructs the printing apparatus to perform cleaning on the nozzle to be cleaned determined by the determination unit.

12 Claims, 8 Drawing Sheets

SERVER, PRINTING SYSTEM AND METHOD OF CONTROLLING PRINTING SYSTEM

The present application is based on, and claims priority from JP Application Serial Number 2022-053106, filed Mar. 29, 2022, the disclosure of which is hereby incorporated by reference herein in its entirety.

BACKGROUND

1. Technical Field

The present disclosure relates to a server, a printing system, and a method of controlling the printing system.

2. Related Art

A known technique collects the remaining amount of ink and the free capacity of the maintenance box from the printer body, determines the type of maintenance and whether the maintenance can be performed, and instructs execution of the maintenance process (for example, JP-A-2020-131631). In this technology, the maintenance process instructed to be executed is monitored, and a notification message is displayed in both cases of completion and error.

The printer body has a cleaning menu that allows the printer to determine the optimal cleaning based on the state of the nozzles.

In the technology in the related art, the type of the maintenance process and whether maintenance can be performed are determined for the entire print head to resolve the malfunction of the nozzles. However, since the print head has a large number of nozzles and the degree of malfunction of each nozzle is different, there is a possibility that some nozzles will require excessive maintenance. Further, performing the maintenance process more than necessary may result in excessive wear of other parts such as ink tubes. Further, in the case where the printer determines the optimum cleaning based on the state of the nozzles, and the like, the cleaning intensity is determined by the printer body, so that it is not easy to improve the determination process.

SUMMARY

According to an aspect of the present disclosure, a server connected via a network to a printing apparatus including a plurality of nozzles includes an acquisition unit that acquires nozzle information indicating a state of the plurality of nozzles, a determination unit that determines, among the plurality of nozzles, a nozzle to be cleaned based on the nozzle information acquired by the acquisition unit, and an instruction unit that instructs the printing apparatus to perform cleaning on the nozzle to be cleaned determined by the determination unit.

According to an aspect of the present disclosure, a printing system includes a printing apparatus including a plurality of nozzles, and a server connected to the printing apparatus via a network, wherein the printing apparatus includes a communication unit that transmits nozzle information indicating a state of the plurality of nozzles to the server, and wherein the server includes an acquisition unit that acquires nozzle information indicating a state of the plurality of nozzles, the nozzle information being transmitted by the printing apparatus, a determination unit that determines, among the plurality of nozzles, a nozzle to be cleaned based on the nozzle information acquired by the acquisition unit, and an instruction unit that instructs the printing apparatus to perform cleaning on the nozzle to be cleaned determined by the determination unit.

According to an aspect of the present disclosure, a method of controlling a printing system including a printing apparatus including a plurality of nozzles and a server connected to the printing apparatus via a network includes the printing apparatus transmitting nozzle information indicating a state of the plurality of nozzles to the server, and the server acquiring nozzle information indicating a state of the plurality of nozzles, the nozzle information being transmitted by the printing apparatus, determining, among the plurality of nozzles, a nozzle to be cleaned based on the acquired nozzle information, and instructing the printing apparatus to perform cleaning on the nozzle determined to be cleaned.

DESCRIPTION OF EXEMPLARY EMBODIMENTS

First Embodiment

Figure 1:
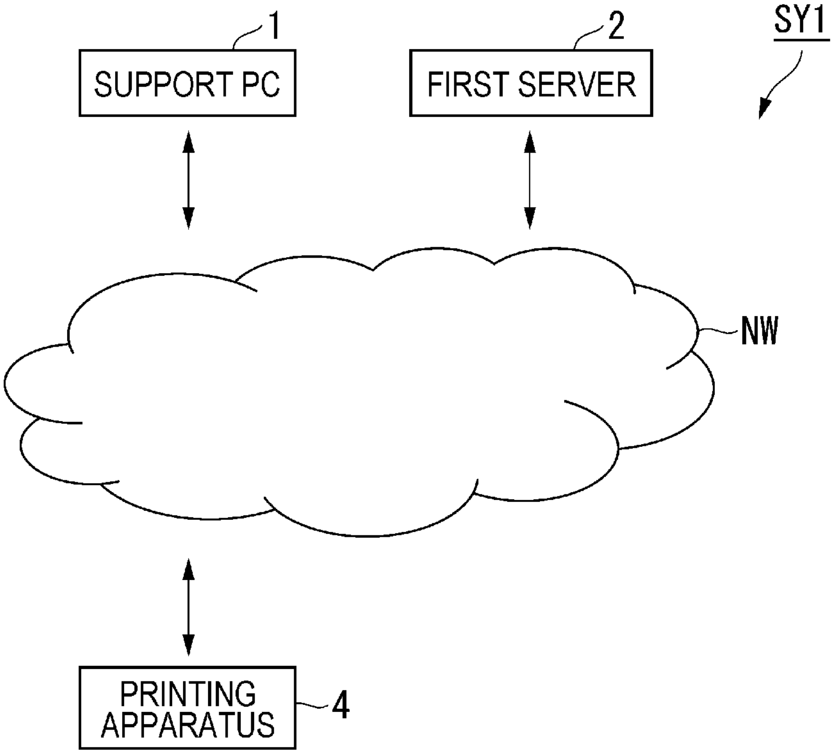
FIG. 1 is a system configuration diagram of a first printing system.

A server, a printing system, and a method of controlling the printing system according to an embodiment will be described below with reference to the accompanying drawings. FIG. 1 is a system configuration diagram of a first printing system SY1. The first printing system SY1 includes a support personal computer (PC) 1, a first server 2, and a printing apparatus 4. The support PC 1, the first server 2 and the printing apparatus 4 are connected via a network NW. Although the network NW is assumed to be an Internet communication network in the present embodiment, it may be a network line such as a LAN.

Although FIG. 1 shows an example in which one support PC 1 and one printing apparatus 4 are connected to one first server 2, a configuration in which a plurality of support PCs 1 and a plurality of printing apparatuses 4 are connected to one first server 2 may be provided.

In the present embodiment, the printing apparatus 4 is assumed to be an ink jet printer. Further, the printing apparatus 4 may be a printer having only a print function, or may be a multifunction machine having a copying function or a scanning function in addition to the print function.

In the first printing system SY1, the printing apparatus 4 is installed on the customer side such as a company or a store. The support PC 1 and the first server 2 are service provider terminals that provide customers with services for supporting the printing apparatus 4. The service provider provides, for example, a service related to maintenance of the printing apparatus 4 as a support service. To implement the service, the first server 2 collects various pieces of information about the printing apparatus 4. For example, the first server 2 collects information indicating the state of a plurality of nozzles of the print head included in the printing apparatus 4.

Among the information of the printing apparatus 4 collected by the first server 2, the information indicating the state of a plurality of nozzles of the print head is hereinafter referred to as "nozzle information".

When the support PC 1 instructs the cleaning process, the first server 2 instructs the printing apparatus 4 to perform nozzle checking. The printing apparatus 4 performs nozzle checking based on the instruction to perform nozzle checking from the first server 2 and notifies the first server 2 of nozzle information including the result of the nozzle checking.

The first server 2 acquires the nozzle information from the printing apparatus 4, and acquires, from the nozzle check result included in the acquired nozzle information, information indicating the location of a nozzle through which the ink is not ejected and information indicating the number or the amount of nozzles through which the ink is not ejected. The first server 2 determines whether cleaning is required based on the acquired information indicating the location of a nozzle through which the ink is not ejected and the acquired information indicating the number or the amount of nozzles through which the ink is not ejected. When the first server 2 determines that cleaning is required, the first server 2 sets the location to be cleaned and the cleaning intensity. Further, when the first server 2 determines that cleaning is required, the first server 2 checks with the support PC 1 whether cleaning can be performed. When the first server 2 can confirm with the support PC 1 that cleaning can be performed, the first server 2 instructs the printing apparatus 4 to perform cleaning.

Figure 2:
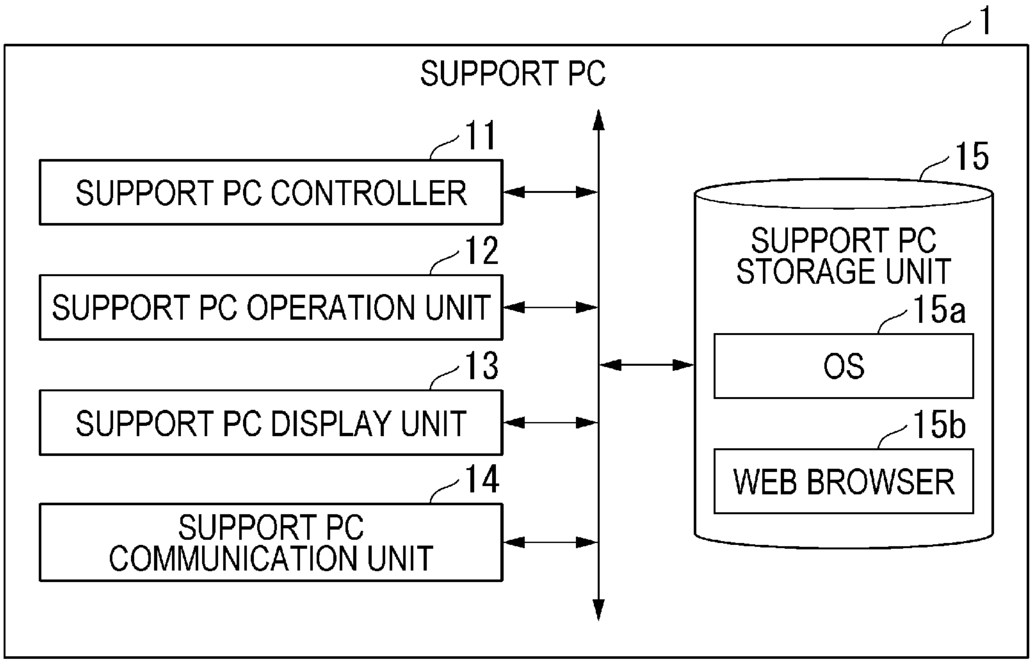
FIG. 2 is a block diagram showing a hardware configuration of a support PC.

Next, the hardware configuration of the support PC 1, the first server 2, and the printing apparatus 4 will be described with reference to FIGS. 2 to 4. FIG. 2 is a block diagram showing the hardware configuration of the support PC 1. The support PC 1 includes a support PC controller 11, a support PC operation unit 12, a support PC display unit 13, a support PC communication unit 14 and a support PC storage unit 15.

The support PC controller 11 includes a processor such as a central processing unit (CPU), a read only memory (ROM), a random access memory (RAM), and the like, and controls respective units in the support PC 1. The support PC operation unit 12 refers to, for example, a keyboard and a mouse, and is used for operations such as designating the printing apparatus 4 to be cleaned and instructing execution of cleaning of the designated printing apparatus 4. The support PC display unit 13 refers to, for example, a liquid crystal display, and displays various pieces of information such as a screen for checking whether cleaning can be performed. The support PC communication unit 14 communicates with the first server 2 via the network NW.

The support PC storage unit 15 refers to, for example, a hard disk drive (HDD) to store an operating system (OS) 15*a*, a WEB browser 15*b*, and the like. The OS 15*a* is basic software for operating various application programs. The WEB browser 15*b* is an application program for displaying WEB pages. Using the WEB browser 15*b*, the support PC controller 11 displays, on the support PC display unit 13, various pieces of information, such as a screen for checking whether cleaning can be performed, provided as a WEB page by the first server 2.

Figure 3:
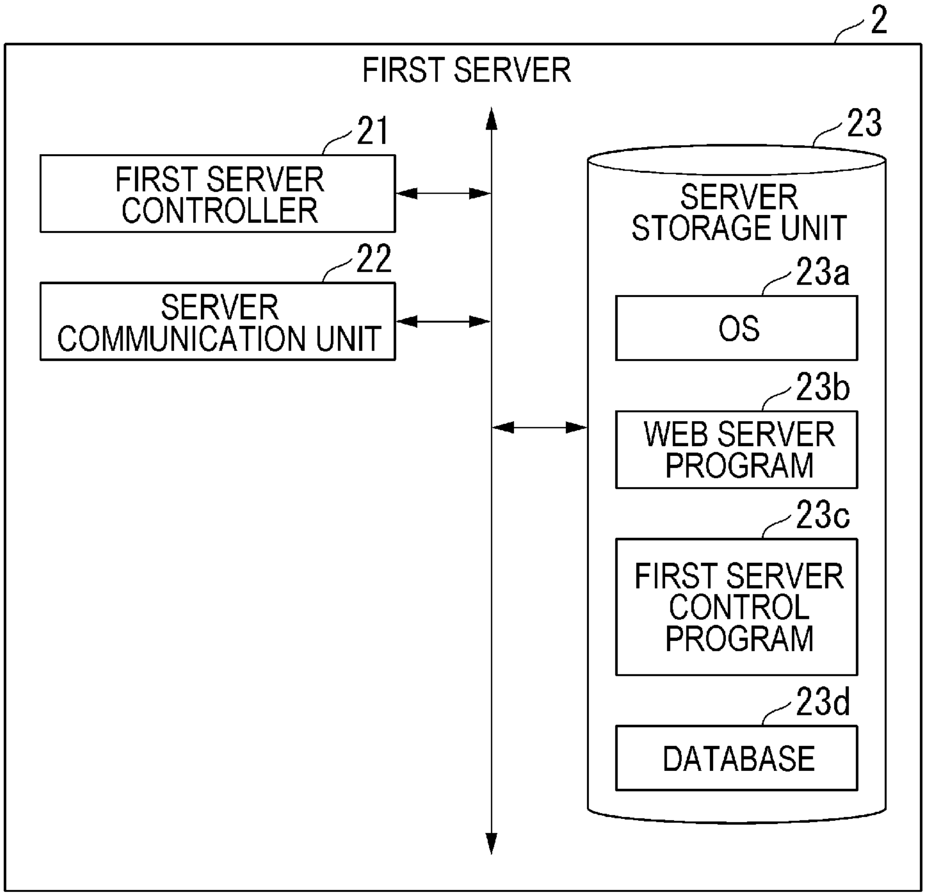
FIG. 3 is a block diagram showing a hardware configuration of a first server.
Figure 4:
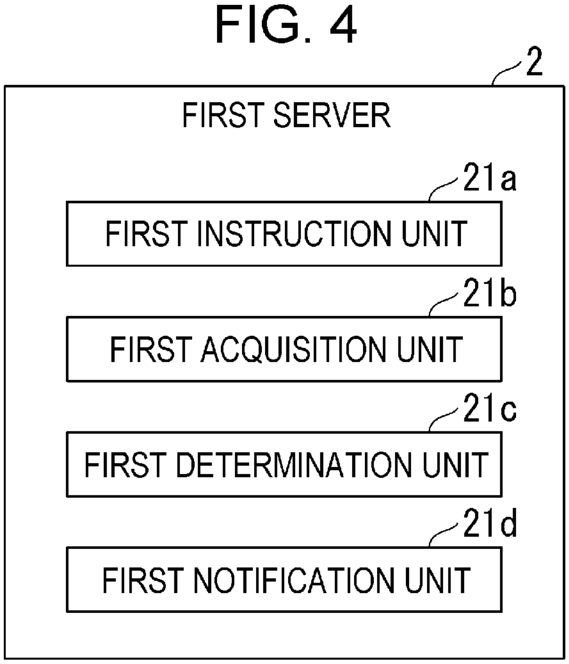
FIG. 4 is a functional block diagram showing functions of the first server.

FIG. 3 is a block diagram showing the hardware configuration of the first server 2. The first server 2 includes a first server controller 21, a server communication unit 22 and a server storage unit 23.

The first server controller 21 includes a processor such as a CPU, a ROM, a RAM, and the like, and controls respective units in the first server 2. The server communication unit 22 communicates with the support PC 1 and the printing apparatus 4 via the network NW.

The server storage unit 23 refers to, for example, an HDD to store an OS 23*a*, a WEB server program 23*b*, a first server control program 23*c*, a database 23*d*, and the like. The OS 23*a* is basic software for operating various application programs. The WEB server program 23*b* is an application program for the first server 2 to function as a WEB server. The first server controller 21 generates a WEB page using the WEB server program 23*b*.

The first server control program 23*c* is an application program for controlling the printing apparatus 4. FIG. 4 is a functional block diagram showing functions of the first server 2. The first server controller 21 uses the first server control program 23*c* to function as a first instruction unit 21*a*, a first acquisition unit 21*b*, a first determination unit 21*c*, and a first notification unit 21*d*. The first instruction unit 21*a* instructs the printing apparatus 4 to perform nozzle checking. The server communication unit 22 receives nozzle information transmitted by the printing apparatus 4.

The first acquisition unit 21*b* acquires nozzle information received by the server communication unit 22. The first determination unit 21*c* acquires the nozzle information from the first acquisition unit 21*b*, and determines whether cleaning is required based on the acquired nozzle information. Specifically, based on the nozzle information, the first determination unit 21*c* determines that cleaning is required when the number or the amount of nozzles through which the ink is not ejected is equal to or greater than a first threshold value, and determines that cleaning is not required when the number or the amount of nozzles through which the ink is not ejected is less than the first threshold value.

When the first determination unit 21*c* determines that cleaning is required, the first determination unit 21*c* determines the location to be cleaned and the cleaning intensity. Specifically, the first determination unit 21*c* sets the location of the nozzle through which the ink is not ejected as the location to be cleaned. The first determination unit 21*c* determines to perform pressure cleaning when the number or the amount of nozzles through which the ink is not ejected is less than a second threshold value, and determines to perform suction cleaning when the number or the amount of nozzles through which the ink is not ejected is equal to or greater than the second threshold value. Here, the second threshold value is a value greater than the first threshold value. Further, when the number or the amount of nozzles through which the ink is not ejected is equal to or greater than the second threshold value, the first determination unit 21*c* may increase the suction cleaning intensity according to the increase in the number of nozzles through which the ink is not ejected. The threshold values (first threshold value, second threshold value) when the number of nozzles through which the ink is not ejected is applied may be different from the threshold values (first threshold value, second threshold value) when the amount of nozzles through which the ink is not ejected is applied.

The first notification unit 21*d* inquires of the support PC 1 whether cleaning can be performed. The first instruction unit 21*a* instructs the printing apparatus 4 to perform cleaning when confirming with the support PC 1 that the cleaning can be performed. Returning to FIG. 3, the description is continued.

The database 23*d* stores a printing apparatus table in which the device names and device IDs of the printing apparatuses 4 that can communicate with the first server 2 are linked. The first server controller 21 refers to the printing apparatus table and provides the support PC 1 with a list of device names of the printing apparatus 4 as a WEB page, thereby receiving designation of the printing apparatus 4 to be cleaned. The printing apparatus 4 to be cleaned is hereinafter referred to as a "target printing apparatus 4". Further, when receiving designation of the target printing apparatus 4, the first server controller 21 designates the device ID of the designated target printing apparatus 4 and instructs execution of the nozzle check.

Figure 5:
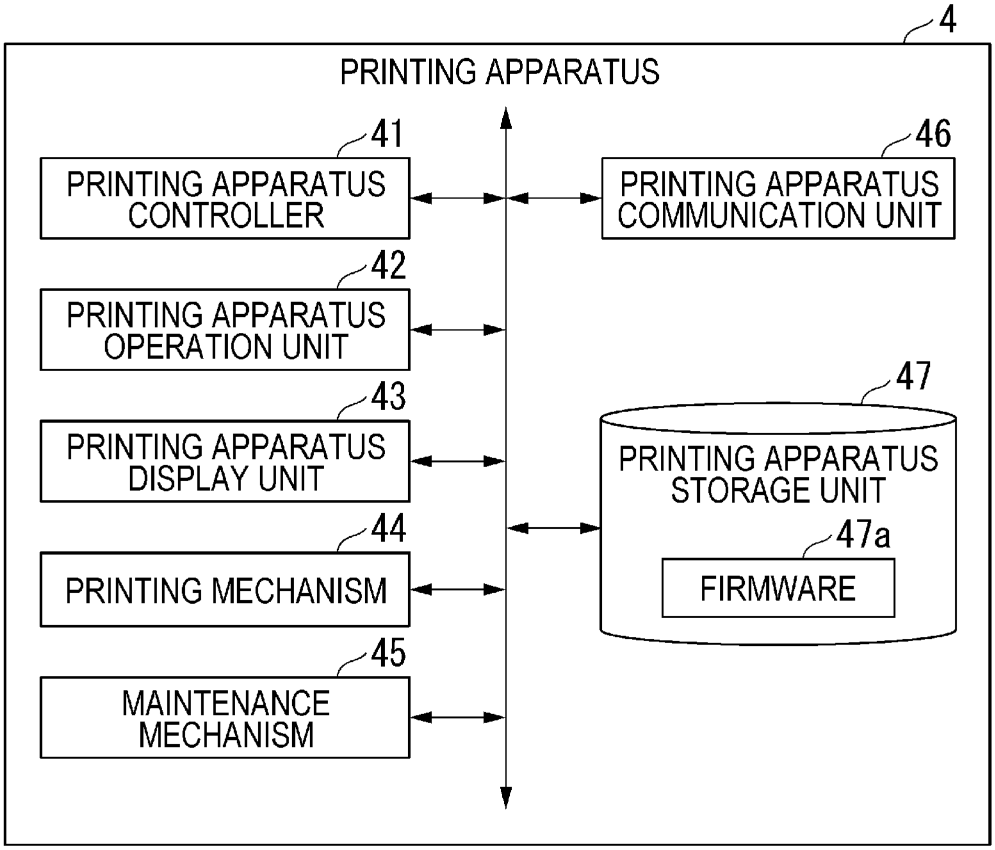
FIG. 5 is a block diagram showing a hardware configuration of a printing apparatus.

FIG. 5 is a block diagram showing the hardware configuration of the printing apparatus 4. The printing apparatus 4 includes a printing apparatus controller 41, a printing apparatus operation unit 42, a printing apparatus display unit 43, a printing mechanism 44, a maintenance mechanism 45, a printing apparatus communication unit 46, and a printing apparatus storage unit 47.

The printing apparatus controller 41 includes a processor such as a CPU, a ROM, a RAM, and the like, and controls respective units in the printing apparatus 4. The printing apparatus operation unit 42 refers to, for example, an operation panel or various buttons, and is used by the user to perform various operations on the printing apparatus 4. The printing apparatus display unit 43 refers to, for example, an operation panel, and displays various pieces of information such as the remaining amount of an ink cartridge 62 (see FIG. 6) and the status of the printing apparatus 4.

The printing mechanism 44 is a mechanism for performing printing on a print medium such as copy paper. The printing mechanism 44 includes an ink jet print head 64 (see FIG. 6), a head drive mechanism that drives the print head 64, a print medium transport mechanism that transports the print medium, and the like.

The maintenance mechanism 45 is a mechanism for performing the maintenance process such as cleaning the print head 64. Although details will be described later, the maintenance mechanism 45 includes a capping device 71 (see FIG. 6), a maintenance box 78 (see FIG. 6), and the like. In the present embodiment, the maintenance mechanism 45 is used for performing pressure cleaning of ejecting the ink, and suction cleaning of sucking the ink from the ink nozzles 66 in order to prevent ejection failure in addition to image formation on the print medium from the ink nozzles 66 (see FIG. 6) provided in the print head 64. Pressure cleaning may be referred to as a flushing process, and suction cleaning may be referred to as a suction process.

The printing apparatus communication unit 46 communicates with the first server 2. The printing apparatus storage unit 47 refers to, for example, a flash memory to store firmware 47*a* and the like. The firmware 47*a* is a control program for controlling the printing apparatus 4. The printing apparatus controller 41 performs communication control with the first server 2 and control of the printing mechanism 44 and the maintenance mechanism 45 using the firmware 47*a*.

Figure 6:
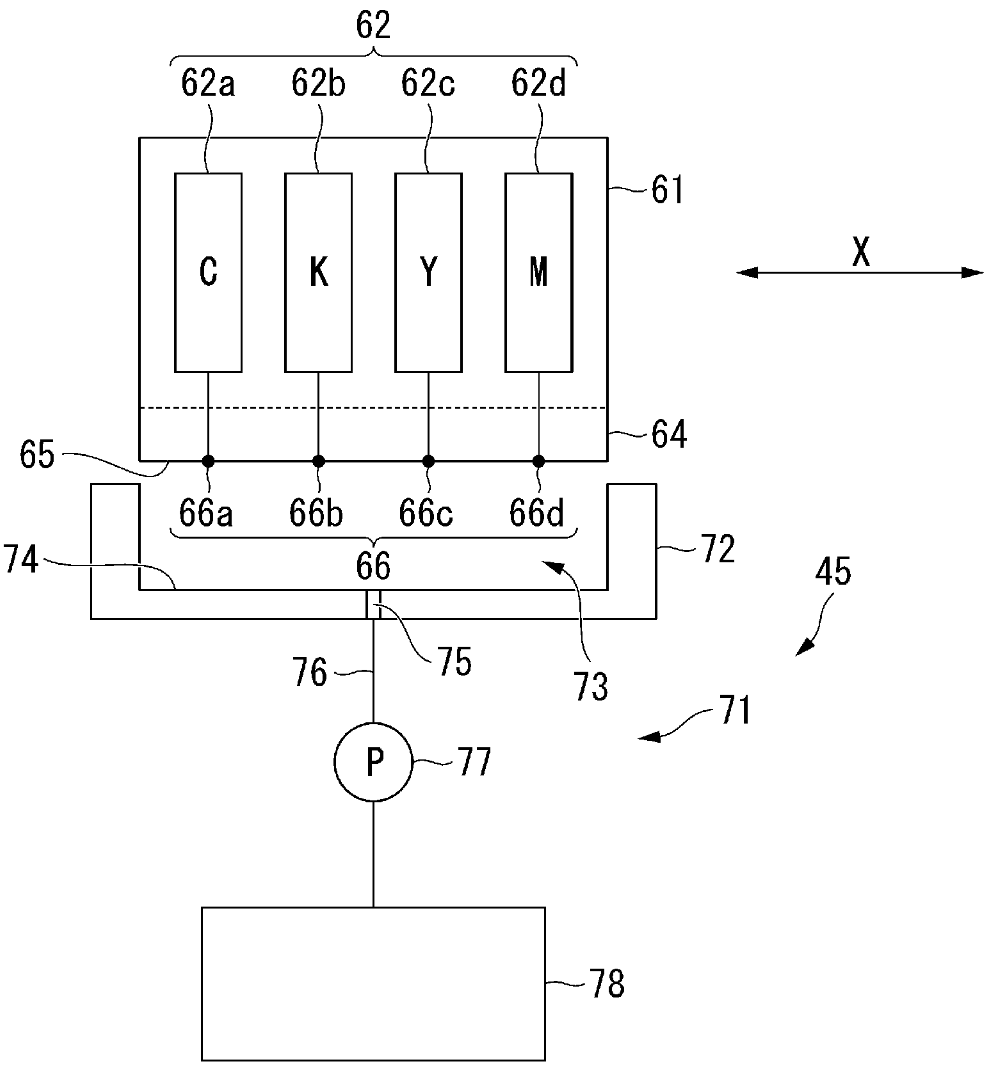
FIG. 6 is a schematic diagram of part of a printing mechanism and a maintenance mechanism.

Next, the printing mechanism 44 and the maintenance mechanism 45 of the printing apparatus 4 will be described with reference to FIG. 6. FIG. 6 is a schematic diagram of part of the printing mechanism 44 and the maintenance mechanism 45. As shown in the figure, the printing apparatus 4 includes, part of the printing mechanism 44, a carriage 61 capable of reciprocating in the main scanning direction indicated by an arrow X, and the print head (print head) 64 that is mounted on the carriage 61 and ejects the ink onto the print medium as the carriage 61 moves.

In the present embodiment, the four-color ink cartridge 62 that store the ink to be supplied to the print head 64 is mounted on the carriage 61. The ink cartridge 62 includes a cyan ink cartridge 62*a* storing the cyan ink, a black ink cartridge 62*b* storing the black ink, a yellow ink cartridge 62*c* storing the yellow ink, and a magenta ink cartridge 62*d* storing the magenta ink. Instead of mounting the ink cartridge 62 on the carriage 61, the ink may be supplied from the ink cartridge 62 arranged at another location to the print head 64 via an ink tube.

The print head 64 is provided with a large number of ink nozzles 66 that eject the ink. The ink nozzles 66 are arranged as a plurality of nozzle rows on a lower face 65 of the print head 64, that is, the nozzle hole forming face. The ink nozzles 66 include a cyan nozzle row 66*a* for ejecting the ink supplied from the cyan ink cartridge 62*a*, a black nozzle row 66*b* for ejecting the ink supplied from the black ink cartridge 62*b*, a yellow nozzle row 66*c* for ejecting the ink supplied from the yellow ink cartridge 62*c*, and a magenta nozzle row 66*d* for ejecting the ink supplied from the magenta ink cartridge 62*d*.

The print head 64 is driven by an actuator configured using a piezo element, and changes the pressure in the cavity filled with the ink supplied from the ink cartridge 62 to eject the ink from the ink nozzles 66 communicating with the cavity.

With the above configuration, the printing apparatus 4 forms an image on a print medium by performing a transport operation of transporting the print medium in the sub-scanning direction orthogonal to the main scanning direction by the print medium transport mechanism, and a printing operation of ejecting the ink from the print head 64 while reciprocating the carriage 61 in the main scanning direction. On the other hand, the printing apparatus 4 moves the carriage 61 so that the print head 64 is positioned at the home position in a standby state in which no printing operation is performed. FIG. 6 shows a state in which the print head 64 is positioned at the home position. The capping device 71 is disposed immediately below the print head 64 positioned at the home position.

The printing apparatus 4 includes, as the maintenance mechanism 45, the capping device 71 and the maintenance box 78. The capping device 71 includes a box-shaped cap main body 72 having an open upper face, a waste ink tube 76 serving as a flow path of the ink discharged from the cap main body 72, and a suction pump 77 that sucks the ink. The cap main body 72 has a frame made of an elastic member, and the internal space of the cap main body 72 is a head storage space 73 for storing the print head 64. The cap main body 72 is configured to be movable up and down by a lifting device (not shown), and the print head 64 is stored in the head storage space 73 at the raised position.

A discharge hole 75 penetrating a lower face 74 is formed in the lower face 74 of the cap main body 72. The ink discharged from the discharge hole 75 is stored in the maintenance box 78 via the waste ink tube 76.

The printing apparatus 4 performs the maintenance process using the capping device 71 as described above. In the present embodiment, the printing apparatus 4 performs pressure cleaning and suction cleaning as a maintenance process. The order, processing time, number of repetitions, and the like of pressure cleaning and suction cleaning in the maintenance process shall be based on a predetermined sequence. Therefore, the amount of the ink consumed by the maintenance process is a predetermined amount, and the first server 2 stores the amount of the ink of each color consumed by the maintenance process as part of the first server control program 23*c*.

The pressure cleaning is a process of performing a waste ejection of the ink from the ink nozzles 66 into the cap main body 72 by applying pressure in a state where the print head 64 is not stored in the head storage space 73. The ink collected in the head storage space 73 is discharged into the maintenance box 78 through the discharge hole 75 and the waste ink tube 76 by the suction of the suction pump 77. In this way, by performing the pressure cleaning, it is possible to eliminate the ejection failure due to the increased viscosity of the ink in the ink nozzles 66 and the ink supply path from the ink cartridge 62 to the ink nozzles 66.

On the other hand, the suction cleaning is a process of sucking the ink collected in the ink nozzles 66 in a state where the print head 64 is stored in the head storage space 73. When the suction pump 77 is driven in a state where the print head 64 is stored in the head storage space 73, air is sucked out from the ink nozzles 66. As a result, the inside of the ink nozzles 66 is in a negative pressure state, and the ink collected in the ink nozzles 66 is forcibly sucked.

Figure 7:
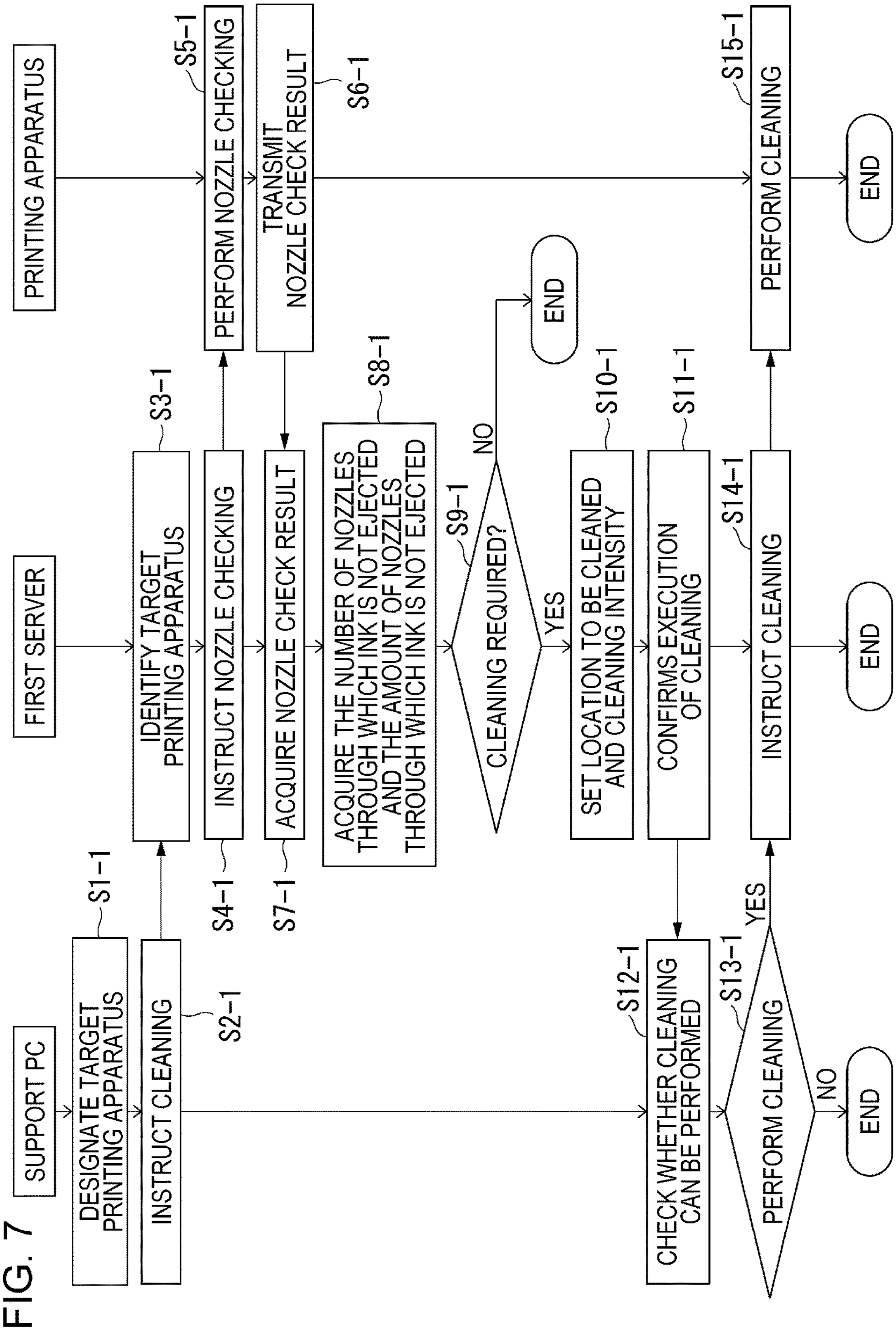
FIG. 7 is a flowchart showing an example of an operation of a first printing system.

FIG. 7 is a flowchart showing an example of the operation of the first printing system SY1. With reference to the flowchart of FIG. 7, the flow of a series of processes when the first printing system SY1 causes the printing apparatus 4 to perform the cleaning described above will be described. Here, it is assumed that a customer who has installed the printing apparatus 4 requests a service provider who provides a support service to perform cleaning, and a series of processes with the consent of both parties is started. In addition, it is assumed that an operator who operates the support PC 1 can perform a login operation and the like on the first server 2 and browse a WEB page provided from the first server 2.

The support PC 1 designates the target printing apparatus 4 on a maintenance process instruction screen (not shown) provided by the first server 2 (S1-1), and instructs cleaning of the target printing apparatus 4 (S2-1). The first server 2 identifies the target printing apparatus 4 designated by the support PC 1 as a cleaning target (S3-1), and instructs the target printing apparatus 4 to perform nozzle checking (S4-1). At this time, the first server 2 refers to the printing apparatus table stored in the database 23*d*, designates the device ID of the target printing apparatus 4 designated by the support PC 1, and instructs the target printing apparatus 4 to perform nozzle checking.

The printing apparatus 4 performs nozzle checking based on the instruction to perform nozzle checking from the first server 2 (S5-1). The printing apparatus 4 creates nozzle information including the result of the nozzle check to transmit the created nozzle information to the first server 2 (step S6-1). The result of the nozzle check includes information identifying a nozzle through which the ink is not ejected, and the number or the amount of nozzles through which the ink is not ejected.

The first server 2 receives the nozzle information transmitted by the printing apparatus 4. The first server 2 acquires the nozzle check result included in the received nozzle information (step S7-1). The first server 2 acquires information identifying the nozzle through which the ink is not ejected and information identifying the number or the amount of nozzles through which the ink is not ejected, which are included in the acquired nozzle check result (step S8-1). The first server 2 determines whether cleaning is required based on the acquired information identifying the number or the amount of nozzles through which the ink is not ejected (S9-1). Here, the first server 2 determines that cleaning is required when the number or the amount of nozzles through which the ink is not ejected is equal to or greater than a pre-stored first threshold value. The first server 2 determines that cleaning is not required when the number or the amount of nozzles through which the ink is not ejected is less than a pre-stored first threshold value.

When the first server 2 determines that cleaning is not required (S9-1: NO), the process ends. Here, the first server 2 may display, on the support PC 1, a screen indicating that cleaning is not required. The screen indicating that cleaning is not required displays, as an example, a message indicating that cleaning is not required and a confirmation button.

On the other hand, when the first server 2 determines that cleaning is required (S9-1: YES), the first server 2 sets the location to be cleaned and the cleaning intensity (S10-1). The first server 2 confirms the execution of cleaning with the support PC 1 (S11-1). The support PC 1 checks whether cleaning can be performed (S12-1). The support PC 1 determines whether to perform cleaning (S13-1). When the support PC 1 determines that cleaning is not performed (step S13-1: NO), the process ends. When the support PC 1 determines that cleaning is performed (step S13-1: YES), the support PC 1 notifies the first server 2 of execution of the cleaning. When the support PC 1 notifies the first server 2 that cleaning is performed, the first server 2 instructs the printing apparatus 4 to perform cleaning (step S14-1). The printing apparatus 4 performs cleaning based on the cleaning execution instruction from the first server 2 (S15-1).

In the above-described embodiment, an example in which the first determination unit 21*c* of the first server 2 acquires information indicating the location of nozzle through which the ink is not ejected and information indicating the number or the amount of nozzles through which the ink is not ejected from the nozzle check result included in the nozzle information is described, but the present disclosure is not limited to this example. For example, the first determination unit 21*c* may acquire information indicating the location of the nozzle having an ink ejection failure and information indicating the number or the amount of the nozzles having an ink ejection failure from the nozzle check result included in the nozzle information. The ejection failure includes a state in which the ink is not sufficiently ejected as well as a state in which no ink is ejected. In the above-described embodiment, the first server 2 may determine nozzles to be cleaned for each row based on the nozzle information. When determining nozzles to be cleaned for each row, the first server 2 may determine to perform cleaning when the number or the amount of nozzles through which the ink is not ejected among the plurality of nozzles included in one row is equal to or greater than a threshold value and may determine not to perform cleaning when it is less than the threshold value. The threshold value when the number of nozzles through which the ink is not ejected is applied may be different from the threshold value when the amount of nozzles through which the ink is not ejected is applied. For example, the first determination unit 21*c* may determine nozzles to be cleaned for each of the cyan nozzle row 66*a*, black nozzle row 66*b*, yellow nozzle row 66*c*, and magenta nozzle row 66*d*. In the above-described embodiment, the first server 2 may determine the cleaning intensity and the nozzle row to be cleaned based on environmental information such as temperature and humidity. For example, based on the environmental information, the first determination unit 21*c* may increase the cleaning intensity when it is determined that the viscosity of the ink is high, and may decrease the cleaning intensity when it is determined that the viscosity of the ink is low. In the above-described embodiment, the first server 2 may notify the support PC 1 of information indicating the nozzle determined to be cleaned. The support PC 1 may display information indicating nozzles notified by the first server 2.

As described above, according to the first printing system SY1 according to the first embodiment, the first server 2 acquires nozzle information indicating the state of a plurality of nozzles from the printing apparatus 4 via the network NW, and determines whether cleaning is required based on the nozzle information. When the first server 2 determines that cleaning is required, the first server 2 determines a nozzle to be cleaned among the plurality of nozzles based on the nozzle information, and instructs the printing apparatus 4 to perform cleaning on the nozzle determined to be cleaned. Since it is possible to determine the nozzle to be cleaned among the plurality of nozzles, the influence of excessive cleaning can be reduced, compared to when cleaning the entire print head.

In this way, the first server 2 determines the nozzle to be cleaned among the plurality of nozzles, and instructs the printing apparatus 4 to perform cleaning on the nozzle determined to be cleaned, so that the printing apparatus 4 can perform proper cleaning. In addition, there is an advantage on the customer can shorten the downtime of the printing apparatus 4 related to cleaning.

Further, based on the nozzle information, the first server 2 can determine to perform cleaning when the number of nozzles through which the ink is not ejected or that has an ink ejection failure is equal to or greater than a threshold value. Therefore, when the number of nozzles through which the ink is not ejected or that has an ink ejection failures is less than the threshold value, cleaning is not performed, so that the number of times of cleaning can be reduced.

Also, the first server 2 can determine the nozzles to be cleaned for each row based on the nozzle information. Therefore, the influence of excessive cleaning can be reduced, when compared to when cleaning the entire print head.

In addition, when the first server 2 can determine to perform cleaning when the number of nozzles through which the ink is not ejected or that has an ink ejection failure among the plurality of nozzles included in one row is equal to or greater than a threshold value in a case where nozzles to be cleaned are determined for each row. Therefore, cleaning is not performed on nozzles in one row in which the number of nozzles through which the ink is not ejected or that has an ink ejection failures among the plurality of nozzles included in the one row is less than a threshold value, so that the number of times of cleaning can be reduced.

In addition, since the first server 2 can determine the cleaning intensity based on the nozzle information, it is possible to reduce the influence of excessive cleaning, compared to when performing cleaning with a uniform cleaning intensity.

In addition, since the first server 2 can determine the cleaning intensity further based on the environmental information, it is possible to perform cleaning with an appropriate intensity compared to, when the cleaning intensity is determined not based on the environmental information.

Moreover, since the first server 2 can determine either pressure cleaning or suction cleaning based on the nozzle information, it is possible to perform cleaning with an appropriate intensity.

Further, when the support PC 1 serving as a terminal device for instructing cleaning issues an instruction to perform cleaning, the first server 2 can instruct the printing apparatus 4 to perform cleaning, so that the support PC 1 can issue an instruction to perform cleaning.

In addition, the first server 2 can notify the terminal device of information indicating the nozzle determined to be cleaned, and the terminal device can display information indicating the nozzle notified by the first server 2, so that the terminal device can make a notification of information indicating the nozzle to be cleaned.

Second Embodiment

Figure 8:
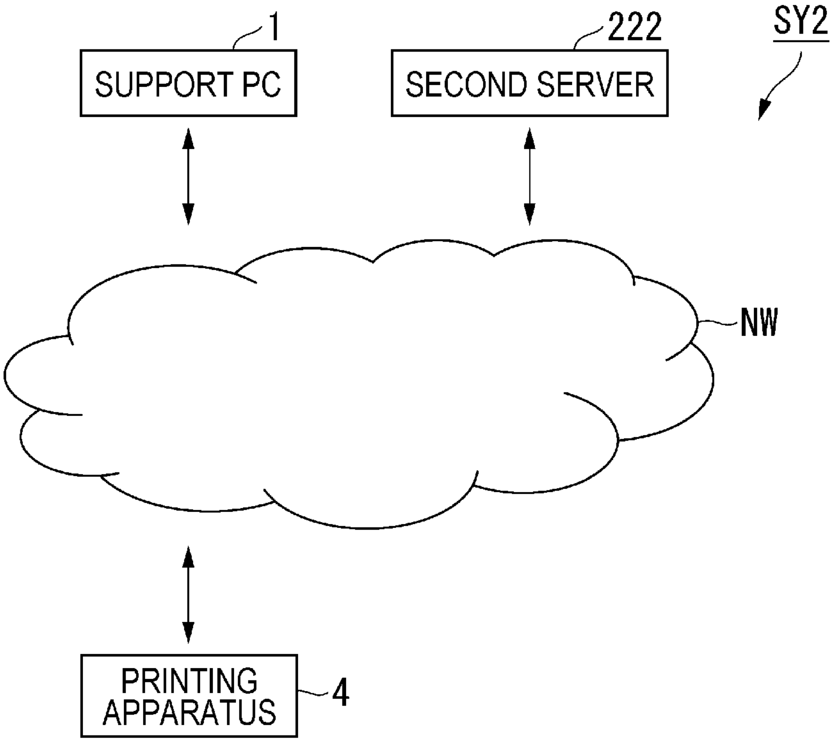
FIG. 8 is a system configuration diagram of a second printing system.

Next, the second embodiment of the present disclosure will be described with reference to FIGS. 8 to 11. FIG. 8 is a system configuration diagram of a second printing system SY2. The second printing system SY2 according to the second embodiment is different from the first printing system SY1 according to the first embodiment in that it has a system configuration including a second server 222 instead of the first server 2. Hereinafter, a description will be given focusing on differences from the first embodiment. In the present embodiment, the components similar to those in the first embodiment are denoted by the same reference numerals, and detailed description thereof is omitted.

Figure 9:
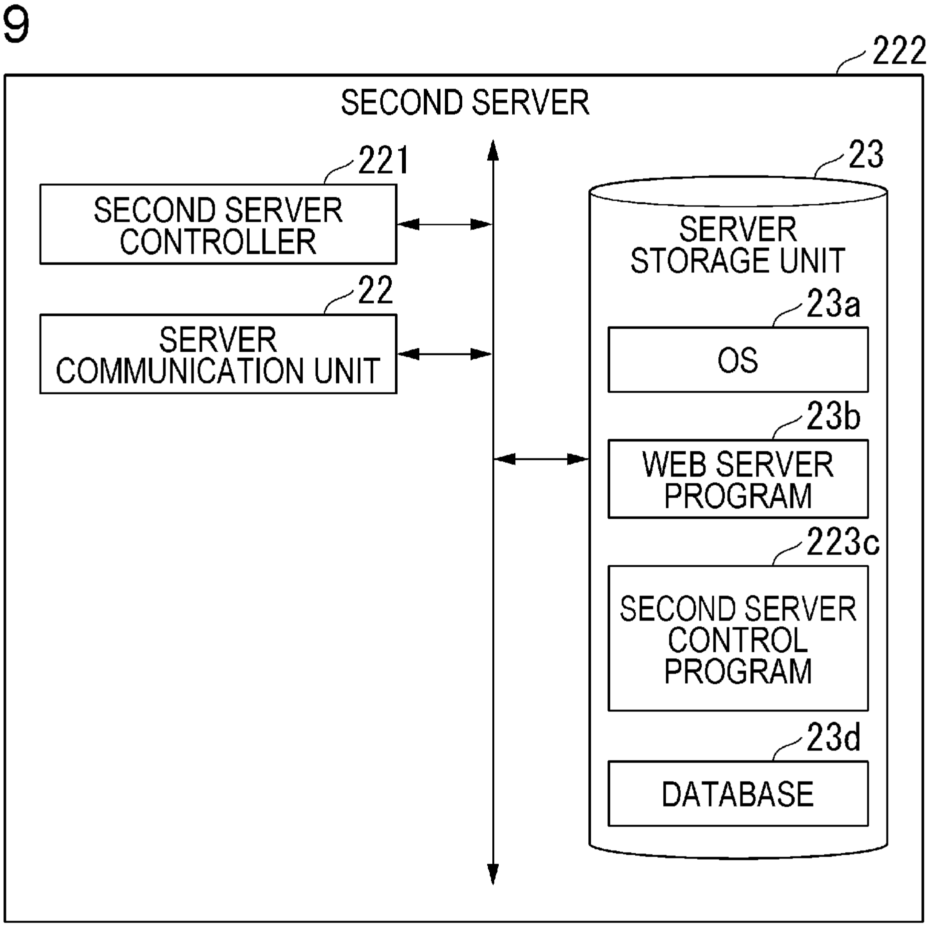
FIG. 9 is a block diagram showing a hardware configuration of a second server.

FIG. 9 is a block diagram showing the hardware configuration of the second server 222. The second server 222 includes a second server controller 221, the server communication unit 22 and the server storage unit 23.

The second server controller 221 includes a processor such as a CPU, a ROM, a RAM, and the like, and controls respective units in the second server 222. The server communication unit 22 communicates with the support PC 1 and the printing apparatus 4 via the network NW.

The server storage unit 23 refers to, for example, an HDD to store the OS 23*a*, the WEB server program 23*b*, a second server control program 223*c*, the database 23*d*, and the like. The second server controller 221 generates a web page using the web server program 23*b*.

Figure 10:
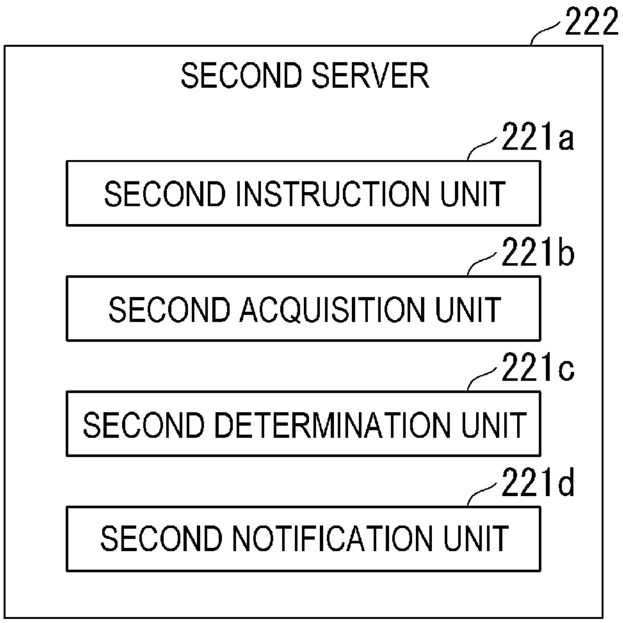
FIG. 10 is a functional block diagram showing functions of the second server.

The second server control program 223*c* is an application program for controlling the printing apparatus 4. FIG. 10 is a functional block diagram showing functions of the second server 222. The second server controller 221 uses the second server control program 223*c* to function as a second instruction unit 221*a*, a second acquisition unit 221*b*, a second determination unit 221*c*, and a second notification unit 221*d*. The second instruction unit 221*a* has the following function in addition to the function of the first instruction unit 21*a*. The second instruction unit 221*a* instructs the printing apparatus 4 to perform nozzle checking after the printing apparatus 4 performs cleaning.

The server communication unit 22 receives nozzle information transmitted by the printing apparatus 4. The second notification unit 221*d* has the following functions in addition to the function of the first notification unit 21*d*. The second notification unit 221*d* acquires nozzle information received by the server communication unit 22. The second notification unit 221*d* creates the cleaning result based on the acquired nozzle information. The cleaning result includes information indicating whether cleaning was successful and information indicating which nozzles were successfully cleaned. Here, information indicating nozzles that have been successfully cleaned may be indicated by row. The second notification unit 221*d* notifies the support PC 1 of the created cleaning result.

The second acquisition unit 221*b* has the following function in addition to the function of the first acquisition unit 21*b*. The second acquisition unit 221*b* acquires nozzle information received by the server communication unit 22. The second determination unit 221*c* has the following functions in addition to the function of the first determination unit 21*c*. The second determination unit 221*c* acquires nozzle information from the second acquisition unit 221*b*, and determines whether cleaning is required based on the acquired nozzle information. Specifically, based on the nozzle information, the second determination unit 221*c* determines that cleaning is required when the number or the amount of nozzles through which the ink is not ejected is equal to or greater than a first threshold value, and determines that cleaning is not required when the number or the amount of nozzles through which the ink is not ejected is less than the first threshold value.

When the second determination unit 221*c* determines that cleaning is required, the second determination unit 221*c* determines the location to be cleaned and the cleaning intensity. More specifically, the second determination unit 221*c* sets the locations of the nozzle through which the ink is not ejected as location to be cleaned. The second determination unit 221*c* determines to perform pressure cleaning when the number or the amount of nozzles through which the ink is not ejected is less than a second threshold value, and determines to perform suction cleaning when the number or the amount of nozzles through which the ink is not ejected is equal to or greater than the second threshold value. Here, the second threshold value is a value greater than the first threshold value. Further, when the number of nozzles through which the ink is not ejected is equal to or greater than the second threshold value, the second determination unit 221*c* may increase the suction cleaning intensity according to the increase in the number of nozzles through which the ink is not ejected. Further, when the second determination unit 221*c* determines that cleaning is required, the cleaning intensity may be set stronger than the previous cleaning intensity.

The second notification unit 221*d* inquires of the support PC 1 whether cleaning can be performed. The second instruction unit 221*a* instructs the printing apparatus 4 to perform cleaning when confirm with the support PC 1 that the cleaning can be performed.

Figure 11:
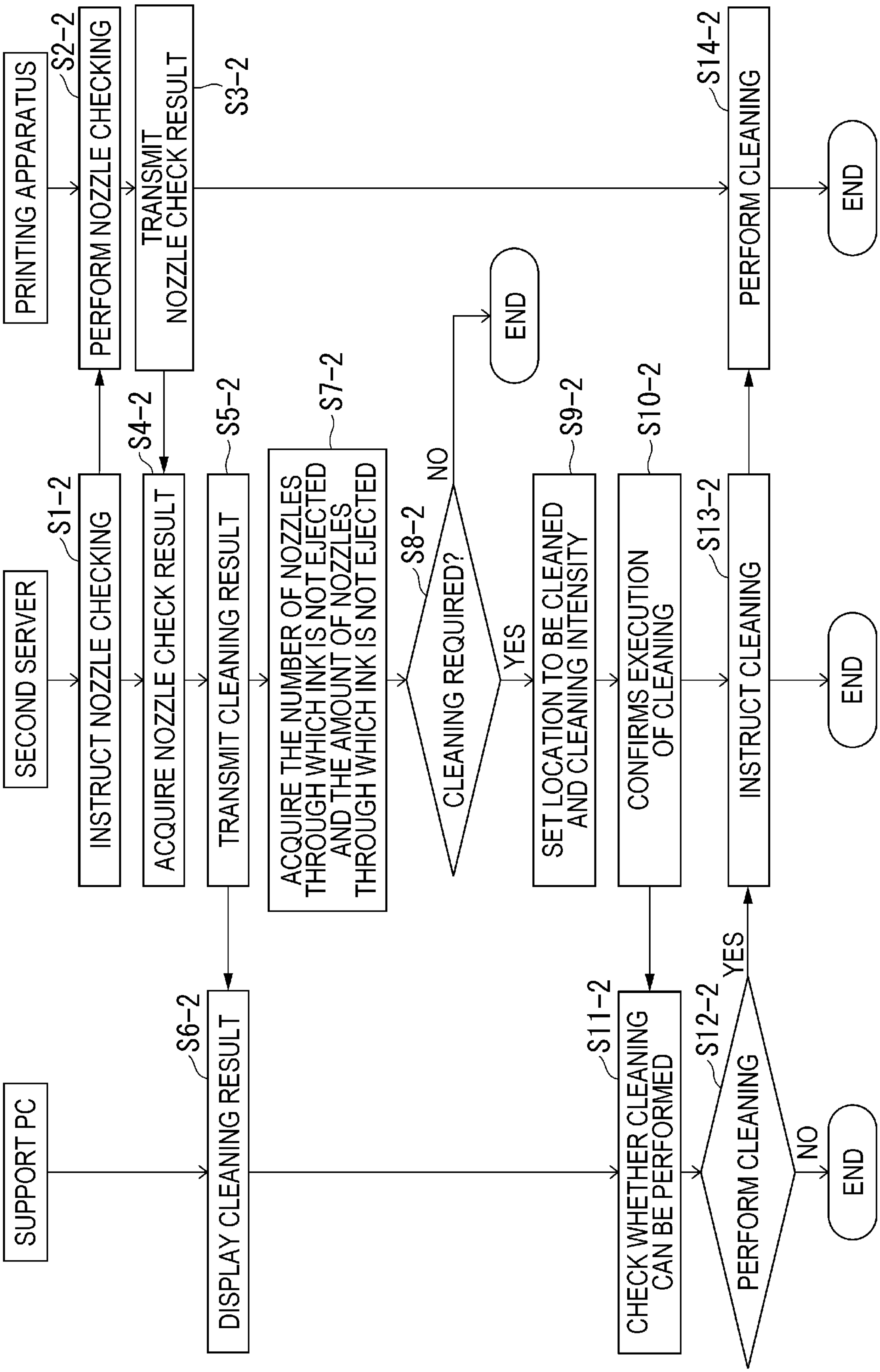
FIG. 11 is a flowchart showing an example of an operation of the second printing system.

FIG. 11 is a flowchart showing an example of the operation of the second printing system SY2. FIG. 11 is a flowchart showing a series of processes for determining whether re-cleaning is required after the second printing system SY2 causes the printing apparatus 4 to perform cleaning. S1-2 to S3-2 and S7-2 to S14-2 are similar to S4-1 to S6-1 and S8-1 to S15-1 of the flowchart (see FIG. 7) showing the processing of the first printing system SY1. The second server 222 receives the nozzle information transmitted by the printing apparatus 4. The first server acquires the nozzle check result included in the received nozzle information (S4-2). The second server 222 creates the cleaning result based on the acquired nozzle check result, and notifies the support PC 1 of the created cleaning result (S5-2). The support PC 1 displays the cleaning result notified by the second server 222 (S6-2).

In the above-described embodiment, an example in which the second determination unit 221*c* of the second server 222 acquires information indicating the location of nozzle through which the ink is not ejected and information indicating the number or the amount of nozzles through which the ink is not ejected from the nozzle check result included in the nozzle information is described, but the present disclosure is not limited to this example. For example, the second determination unit 221*c* may acquire information indicating the location of the nozzle having an ink ejection failure and information indicating the number or the amount of the nozzles having an ink ejection failure from the nozzle check result included in the nozzle information. In the above-described embodiment, the second server 222 may acquire, from the printing apparatus 4, nozzle information after cleaning is performed and notify the support PC 1 of the nozzle information after cleaning is performed. As described above, according to the second printing system SY2 according to the second embodiment, the second server 222 acquires, from the printing apparatus 4, nozzle information after cleaning is performed, and notifies the support PC 1 of the nozzle information after cleaning is performed. Since it is possible to notify the support PC 1 of the nozzle information after cleaning is performed, it is possible to make a notification of the cleaning result.

In addition, the second server 222 determines, based on the nozzle information after cleaning is performed, whether to perform further cleaning, and when it is determined to perform the further cleaning, the second server 222 sets the cleaning intensity stronger than that at the previous time. Therefore, it is possible to perform cleaning with an appropriate intensity, compared to when performing re-cleaning with the intensity same as that at the previous cleaning.

Although two embodiments have been described above, the following modifications can be applied without limited to these embodiments.

First Modification

Note that the first server 2 and the second server 222 may use, as the nozzle information, information other than the information detected by the actuator. For example, information obtained by optically detecting, for each ink nozzle 66, a state in which ink droplets are not ejected from each ink nozzle 66 may be used as the nozzle information. In addition, information obtained by detecting an ejection failure of the ink nozzles 66 by a known method may be used as the nozzle information.

Second Modification

In each of the above-described embodiments, the first server 2 and the second server 222 instruct the printing apparatus 4 to perform nozzle checking based on an instruction to perform cleaning from the support PC 1, but the printing apparatus 4 may be instructed to perform nozzle checking at a predetermined timing. The predetermined timing may include when the server 2 or the printing apparatus 4 is activated, or a predetermined time or regular time intervals.

Third Modification

In each of the above embodiments, the first server 2 and the second server 222 instruct the printing apparatus 4 to perform nozzle checking and acquire nozzle information. When the status of the printing apparatus 4 is acquired at this time, and it is determined from the acquired status that cleaning cannot be performed, an error message indicating the determined result may be displayed on the support PC 1. For example, when the first server 2 and the second server 222 acquire a status indicating that the printing apparatus 4 is in the process of performing printing or a status indicating that an error has occurred in the printing apparatus 4, it may be determined that cleaning cannot be performed.

Fourth Modification

Methods of performing the respective processes of the support PC 1, the first server 2, the second server 222 and the printing apparatus 4 described in the above embodiments and the above modifications, programs for executing the respective processes of the support PC1, the first server 2, the second server 222 and the printing apparatus 4, and a computer-readable recording medium recording the programs are also included in the scope of the right of the disclosure. Moreover, the configuration may be a combination of the respective embodiments and the respective modifications.

Fifth Modification

In addition, the ink jet method of the printing apparatus 4 is not limited to the piezo method using a piezo element as an actuator, and other methods such as an electrostatic actuator method and a bubble method may be employed. Further, the printing method of the printing apparatus 4 is not limited to the serial head method, and other methods such as a line head method may be employed. Further, instead of the support PC 1, various pieces of information processing terminals such as various tablet terminals and smartphones may be used. The ink cartridge 62 may be an ink container such as a pouch-type ink pack or an ink tank that stores ink poured from an ink bottle.

In the above embodiments, an example of the printing apparatus may include a multifunction machine having a print function and other functions. The other functions may be, for example, one or more of a scanner function, a copy function, a facsimile function, and the like.

A program for implementing the functions of any component in the device described above is recorded on a computer-readable recording medium, and the program may be loaded into a computer system and executed. The term "computer system" as used herein includes hardware such as an operating system or a peripheral device. The "computer-readable recording medium" refers to portable media such as a flexible disc, a magneto-optical disc, a read only memory (ROM), a compact disc (CD)-ROM, and the like, and storage devices such as hard disks built into computer systems. The "computer-readable recording medium" includes a server when a program is transmitted via a network such as the Internet or a communication line such as a telephone line, or a medium that holds a program for a certain period of time, such as a volatile memory in the computer system that is a client. The volatile memory may be a RAM. The recording medium may be a non-transitory recording medium.

The above program may be transmitted from a computer system in which this program is stored in a storage device or the like to another computer system via a transmission medium or by a transmission wave in the transmission medium. The "transmission medium" that transmits a program refers to a medium having a function of transmitting information, such as a network such as the Internet or a communication line such as a telephone line. The above program may be a program for implementing part of the above-mentioned functions. The above program may be a so-called difference file that can implement the above-mentioned functions in combination with a program already recorded in the computer system. The difference file may be referred to as a difference program.

The functions of any component in any device described above may be implemented by a processor. Each process in the embodiment may be implemented by a processor that operates based on information such as a program and a computer-readable recording medium that stores the information such as the program. In the processor, the functions of each component may be implemented by individual hardware, or the functions of each component may be implemented by integrated hardware. The processor may include hardware, which may include at least one of a circuit that processes a digital signal and a circuit that processes an analog signal. The processor may be configured with one or more circuit devices mounted on a circuit board, or one or all of one or more circuit elements. An example of the circuit device may include an integrated circuit (IC), and an example of the circuit element may include a resistor or a capacitor.

The processor may be a CPU. However, the processor is not limited to the CPU, and examples thereof may include various processors such as a graphics processing unit (GPU) and a digital signal processor (DSP). The processor may be a hardware circuit based on an application specific integrated circuit (ASIC). The processor may be composed of a plurality of CPUs, or may be composed of a hardware circuit including a plurality of ASICs. The processor may be composed of a combination of a plurality of CPUs and a hardware circuit including a plurality of ASICs. The processor may include one or a plurality of an amplifier circuit and a filter circuit that process an analog signal.

Although the embodiments are described in detail with reference to the drawings, the specific configuration is not limited to the embodiment, and the design and the like within a range not deviating from the gist of this disclosure are also included.

What is claimed is:

1. A server comprising:

an acquisition unit that acquires first nozzle information indicating a state of a plurality of nozzles, wherein the server is connected via a network to a printing apparatus including the plurality of nozzles;

a determination unit that determines, among the plurality of nozzles, a nozzle of the plurality of nozzles to be cleaned based on the first nozzle information acquired by the acquisition unit, wherein the nozzle is cleaned when a number of nozzles among the plurality of nozzles having an ink ejection failure is equal to or greater than a first threshold value based on the first nozzle information; and an instruction unit that instructs the printing apparatus to perform cleaning on the nozzle to be cleaned determined by the determination unit.

2. The server according to claim 1, wherein the determination unit further determines the plurality of nozzles to be cleaned for each row.

3. The server according to claim 2, wherein the determination unit further determines that a cleaning process is performed when the number of nozzles having the ink ejection failure among the plurality of nozzles included in one row is equal to or greater than a second threshold value.

4. The server according to claim 1, wherein
the determination unit further determines cleaning intensity based on the first nozzle information.

5. The server according to claim 4, wherein
the determination unit determines the cleaning intensity further based on environmental information.

6. The server according to claim 4, wherein
the determination unit further determines either pressure cleaning or suction cleaning based on the first nozzle information.

7. The server according to claim 1, wherein
the instruction unit further instructs the printing apparatus to perform the cleaning when a terminal device issues an instruction to perform cleaning.

8. The server according to claim 1, further comprising:
a notification unit that notifies a terminal device of information indicating the nozzle to be cleaned determined by the determination unit, wherein
the terminal device displays the information, that indicates the nozzle, notified by the notification unit.

9. The server according to claim 8, wherein
the acquisition unit acquires, from the printing apparatus, second nozzle information after the cleaning is performed, and wherein
the notification unit notifies the terminal device of the second nozzle information after the cleaning is performed.

10. The server according to claim 9, wherein
the determination unit
determines, based on the second nozzle information after the cleaning is performed, the first nozzle information being acquired by the acquisition unit, to perform further cleaning, and
sets cleaning intensity stronger than cleaning intensity at a previous time when determining to perform the further cleaning.

11. A printing system comprising:
a printing apparatus including a plurality of nozzles; and
a server connected to the printing apparatus via a network, wherein
the printing apparatus includes
a communication unit that transmits nozzle information indicating a state of the plurality of nozzles to the server, and wherein the server includes
an acquisition unit that acquires the nozzle information indicating the state of the plurality of nozzles, the nozzle information being transmitted by the printing apparatus,
a determination unit that determines, among the plurality of nozzles, a nozzle of the plurality of nozzles to be cleaned based on the nozzle information acquired by the acquisition unit, wherein the nozzle is cleaned when a number of nozzles among the plurality of nozzles having an ink ejection failure is equal to or greater than a threshold value based on the nozzle information, and
an instruction unit that instructs the printing apparatus to perform cleaning on the nozzle to be cleaned determined by the determination unit.

12. A method of controlling a printing system, the method comprising:
transmitting, by a printing apparatus, nozzle information indicating a state of a plurality of nozzles to a server, wherein
the printing system includes the printing apparatus,
the printing apparatus includes the plurality of nozzles, and
the server is connected to the printing apparatus via a network; and
acquiring, by the server, the nozzle information indicating the state of the plurality of nozzles, the nozzle information being transmitted by the printing apparatus,
determining, among the plurality of nozzles, a nozzle of the plurality of nozzles to be cleaned based on the acquired nozzle information, wherein the nozzle is cleaned when a number of nozzles among the plurality of nozzles having an ink ejection failure is equal to or greater than a threshold value based on the nozzle information, and
instructing the printing apparatus to perform cleaning on the nozzle determined to be cleaned.

* * * * *